J. A. STEPHENS.
Draft Equalizer.
No. 200,629.   Patented Feb. 26, 1878.
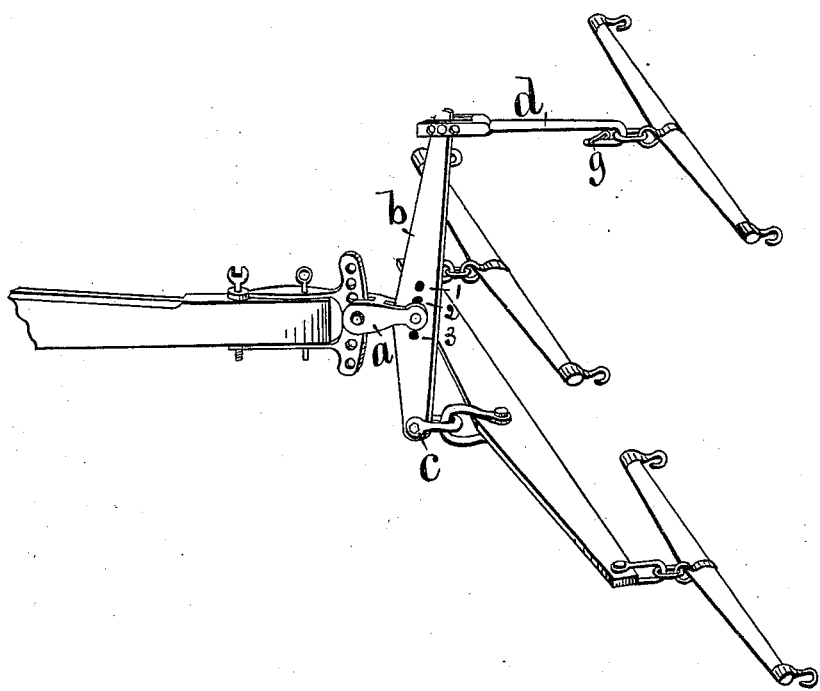
Witnesses:
R.G. Orwig.
W.A. White.
Inventor:
James A. Stephens,
By Thomas G. Orwig,
Attorney.

UNITED STATES PATENT OFFICE.

JAMES A. STEPHENS, OF METZ, IOWA, ASSIGNOR OF ONE-HALF HIS RIGHT TO THOMAS TENNANT, OF SAME PLACE.

IMPROVEMENT IN DRAFT-EQUALIZERS.

Specification forming part of Letters Patent No. 200,629, dated February 26, 1878; application filed May 28, 1877.

*To all whom it may concern:*

Be it known that I, JAMES A. STEPHENS, of Metz, in the county of Jasper and State of Iowa, have invented an Improved Three-Horse Evener, of which the following is a specification:

My invention is an adjustable attachment for plows and other machinery, specially adapted for applying and equalizing the draft of three horses at the same time.

It consists in an adjustable single-tree carrier, having a holding device in its front end, being combined with a double-tree carrier that is adjustable in a combined clevis and fulcrum, as hereinafter fully set forth.

My drawing is a perspective view, illustrating the construction, application, and operation of my complete invention.

$a$ represents my combined clevis and fulcrum, formed complete in one piece, of cast or wrought metal. It is solid in the center and slotted vertically at each end, and the bifurcated ends perforated for the introduction and retention of transverse bolts. It is connected with a plow-beam by means of a common clevis in a common way.

$b$ is a lever, pivoted in the front end of the piece $a$ in a vertical position. It has a series of perforations, 1 2 3, through which a bolt is passed horizontally, in such a manner as to rest in corresponding holes formed in the front and bifurcated end of the piece $a$, to constitute a fulcrum upon which the lever can vibrate backward and forward.

$c$ is a link or clevis in the perforated lower end of the lever $b$, by means of which a double-tree is connected, as indicated.

$d$ is a single-tree carrier, bifurcated at its rear end, and bent downward and backward at its front end. It has a series of perforations in its rear and bifurcated end, through which a bolt is passed horizontally to connect it with the top and perforated end of the lever $b$.

By changing the bolt in the holes of the piece $d$, it is readily lengthened and shortened and adjusted as required to suit different animals.

$g$ is a loop hinged in the front and bent end of the carrier $d$, in such a manner as to allow the coupling-ring of a single-tree to enter the hook and to resist its escape, and thus to serve as a locking device.

In the practical operation of my invention, one horse is hitched to each end of the double-tree, connected with the lower end of the vibrating lever $b$, and another horse is placed between them and hitched to the single-tree, supported in a central position by the carrier $d$, and the draft of the three animals is all applied in a central line to the front end of the plow-beam by means of the central vertical lever $b$, which carries and supports both the double-tree and the single-tree, to which the three horses are hitched, and also equalizes the draft between the two outside animals, and the central animal by vibrating in a central position relative to the joint draft of the three animals.

I am aware that a vertical oscillating lever, carrying a single-tree at its top end and a double-tree at its lower end, has been combined with a plow; but I claim that my combination of a combined clevis and fulcrum, an oscillating lever carrying a link in its bottom, and an adjustable single-tree holding and carrying device at its top, produces an improved article of manufacture that can be advantageously applied and used wherever three horses are attached to pull in the same direction alongside of each other.

I claim as my invention—

1. In a three-horse equalizer, the bifurcated adjustable single-tree carrier $d$, having a locking device, $g$, in its front end, in combination with a vertical oscillating lever, $b$, substantially as and for the purposes shown and described.

2. As an improved article of manufacture, the three-horse equalizer composed of the combined clevis and fulcrum $a$, the oscillating and vertically adjustable lever $b$, carrying the link $c$ at its lower end, and the adjustable and horizontal single-tree carrier $d$, having a holding device, $g$, in its front end, substantially as and for the purposes shown and described.

JAMES A. STEPHENS.

Witnesses:
ARTHUR STIMSON,
D. F. CALLENDER.